US009886864B1

(12) United States Patent
Chubb et al.

(10) Patent No.: US 9,886,864 B1
(45) Date of Patent: Feb. 6, 2018

(54) METHODS FOR AERIAL AVOIDANCE

(71) Applicant: X Development LLC, Mountain View, CA (US)

(72) Inventors: Erik Christopher Chubb, Alameda, CA (US); Thomas Van Alsenoy, Oakland, CA (US); Fort Felker, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 7 days.

(21) Appl. No.: 15/014,618

(22) Filed: Feb. 3, 2016

(51) Int. Cl.
| | | |
|---|---|---|
| *G05D 1/10* | (2006.01) | |
| *F03D 7/00* | (2006.01) | |
| *G08G 5/04* | (2006.01) | |
| *B64C 39/02* | (2006.01) | |
| *B64F 3/00* | (2006.01) | |
| *F03D 5/00* | (2006.01) | |

(52) U.S. Cl.
CPC .............. *G08G 5/04* (2013.01); *B64C 39/022* (2013.01); *B64C 39/024* (2013.01); *B64F 3/00* (2013.01); *F03D 5/00* (2013.01); *G05D 1/101* (2013.01); *B64C 2201/12* (2013.01)

(58) Field of Classification Search
None
See application file for complete search history.

(56) References Cited

U.S. PATENT DOCUMENTS

| | | | |
|---|---|---|---|
| 8,123,476 B2 | 2/2012 | Stommel | |
| 8,598,998 B2 | 12/2013 | Vassilev et al. | |
| 8,742,977 B1 | 6/2014 | Piesinger | |
| 2009/0185900 A1 | 7/2009 | Hirakata et al. | |
| 2010/0013225 A1* | 1/2010 | Ippolito | F03D 3/062 290/44 |
| 2015/0039161 A1 | 2/2015 | Hastings et al. | |
| 2015/0076284 A1* | 3/2015 | Chubb | B64C 39/022 244/1 TD |
| 2015/0130618 A1 | 5/2015 | Hamminga et al. | |
| 2015/0175262 A1* | 6/2015 | Jensen | B64C 31/06 244/155 A |
| 2015/0230450 A1 | 8/2015 | Norris | |

* cited by examiner

*Primary Examiner* — Adam D Tissot
(74) *Attorney, Agent, or Firm* — McDonnell Boehnen Hulbert & Berghoff LLP

(57) ABSTRACT

A method is disclosed where an airborne wind turbine (AWT) is prevented from coming into contact with airborne objects such as birds and bats. The AWT determines the location and characteristics of the incoming airborne objects, and depending on the determined risk value, may shift the location of the aerial vehicle of the AWT in order to avoid the risk of colliding with the airborne objects. Other considerations used by the AWT's determination may include whether the aerial vehicle can continue to generate electricity while performing the avoidance maneuver.

20 Claims, 6 Drawing Sheets

METHODS FOR AERIAL AVOIDANCE

BACKGROUND

Unless otherwise indicated herein, the materials described in this section are not prior art to the claims in this application are not admitted to be prior art by inclusion in this section.

With an increasing demand for energy and fossil fuels in limited supply, the demand for renewable energy sources is growing steadily. To meet such demand, various types of power generation systems have been designed to convert chemical and/or mechanical energy (e.g., kinetic energy) to electrical energy. Many of these power generation systems utilize wind energy by converting the kinetic energy of the wind to electrical energy. Traditional wind turbines include blades or propellers that can be rotated by the wind to convert wind energy to rotational energy, as well as systems for converting this rotational energy into electrical energy.

An Airborne Wind Turbine (AWT) is a wind energy system that utilizes a tethered aerial vehicle to generate electrical power, which is transferred from the aerial vehicle to the grid via the tether. For example, an AWT may include an aerial vehicle that flies in a closed (e.g., ellipsoidal, and perhaps circular) path to generate power. The ground station and tether may allow for rotation of the tether about the ground station, perhaps continuously. As such, the aerial vehicle's flight path may be oriented with respect to the ground station and wind direction such that the apparent wind rotates the vehicle's propellers and thereby generates electrical energy. The energy generated by the rotation of the propellers may then be transferred via a tether to a ground station, which is connected to the electrical grid.

There may be instances where the potential trajectory of airborne objects, such as bats, birds, or unmanned objects, may lead it directly in the path of the aerial vehicle of the AWT. The AWT will analyze numerous location and position information of both the airborne objects and the aerial vehicle to determine whether the aerial vehicle may need to shift to a different flight path in order to avoid colliding with the incoming airborne objects.

SUMMARY

The present disclosure generally relates to a method and system that prevents an airborne wind turbine (AWT) from coming into contact with airborne objects such as bats, birds, or unmanned objects. The AWT determines the location and characteristics of the incoming airborne objects, and depending on the determined risk value, may shift the location of the aerial vehicle of the AWT in order to avoid the risk of colliding with the airborne objects. Other considerations used by the AWT's determination may include whether the aerial vehicle can continue to generate electricity while performing the avoidance maneuver.

In one aspect, a method discloses initially operating an aerial vehicle to travel on a first closed flight path, wherein the first closed flight path is within a first operating area, and wherein the aerial vehicle is connected to a ground station via a tether and generates power while traveling on the first closed flight path, and determining location information corresponding to an airborne object. Based at least in part on the location information corresponding to the airborne object, determining a second operating area for the aerial vehicle, wherein operation of the aerial vehicle within the second operating area reduces risk of contact between the aerial vehicle and the airborne object as compared to operation within the first operating area and responsively operating of the aerial vehicle to travel on a second closed flight path, wherein the aerial vehicle remains within the second operating area while traveling on the second closed path. The aerial vehicle continues generating power while traveling on the second closed path.

In one embodiment the average power generation while traveling on the second closed path is less than the average power generation while traveling on the first closed path. In another embodiment, operating the aerial vehicle to travel on the second closed flight path comprises causing the aerial vehicle to transition from the first closed flight path to the second closed flight path, wherein the transition corresponds to rotation about the ground station.

In some embodiments, the first closed flight path is located substantially downwind of the ground station such that travel of the aerial vehicle on the first closed flight path comprises crosswind flight, and the rotation about the ground station during the transition is such that the second closed flight path is angularly offset from the substantially downwind position of the first closed flight path.

In another embodiment, the rotation about the ground station comprises a rotation in the range of +/−10 degrees between the location of the first closed flight path and the location of the second closed flight path. In one embodiment, the method further discloses determining that a risk of contact between the aerial vehicle and the airborne object is greater than a threshold risk.

In one embodiment, the method further discloses determining the risk of contact, wherein determining the risk of contact comprises based on the location information, determining predicted trajectory information for the airborne object and comparing the predicted trajectory information to the first operating area associated with the first closed flight path to determine the risk of contact between the aerial vehicle and the airborne object.

In a further embodiment, the method discloses determining the second operating area comprises comparing predicted trajectory information for the airborne object to the first operating area associated with the first closed flight path, based on the comparison, identifying an area that will reduce the risk of contact between the aerial vehicle and the airborne object as compared to the first operating area and selecting the identified area as the second operating area.

In some embodiments, the airborne object comprises one or more animals capable of flight. In another embodiment, the one or more animals comprise one or more birds or one or more bats.

In one embodiment, the method discloses determining a particular species of the animal and using the particular species of the animal as a further basis for determining the second operating area, such that operation of the aerial vehicle in the second operating area reduces the risk of contact between the aerial vehicle and the particular species, as compared to operation of the aerial vehicle in the first operating area.

In another embodiment, the method further discloses determining one or more flight characteristics of the object and using the one or more flight characteristics as a further basis for determining the second operating area, such that operation of the aerial vehicle in the second operating area reduces the risk of contact between the aerial vehicle and the airborne object, as compared to operation of the aerial vehicle in the first operating area. In some embodiments, the one or more flight characteristics comprise the one or more of the following flight characteristics: (a) maximum, minimum, or average flight speed; (b) maximum, minimum, or average flight altitude; (c) seasonal variations of flight characteristic; (d) flock characteristics.

In another embodiment, the first closed flight path has a first alignment with respect to a first wind direction, and the first alignment is selected in an effort to increase average power generation, the second closed flight path has a second alignment with respect to a second wind direction, and the second alignment is determined so as to maintain average power generation to the extent possible while reducing the risk of contact between the aerial vehicle and the airborne object to an acceptable level.

In another aspect a system is disclosed. The system includes a sensor system operable to detect airborne objects, a communication system for communicating with an aerial vehicle, wherein the aerial vehicle is connected to a ground station via a tether, a computing system comprising a processor, wherein the computing system is configured to initially operate the aerial vehicle to travel on a first closed flight path, wherein the first closed flight path is within a first operating area, and wherein the aerial vehicle generates power while traveling on the first closed flight path operate the sensor system to determine location information corresponding to a particular airborne object, based at least in part on the location information corresponding to the particular airborne object, determine a second operating area for the aerial vehicle, wherein operation of the aerial vehicle within the second operating area reduces risk of contact between the aerial vehicle and the airborne object as compared to operation within the first operating area, responsively operate of the aerial vehicle to travel on a second closed flight path, wherein the aerial vehicle remains within the second operating area while traveling on the second closed path.

DETAILED DESCRIPTION

Figure 1:
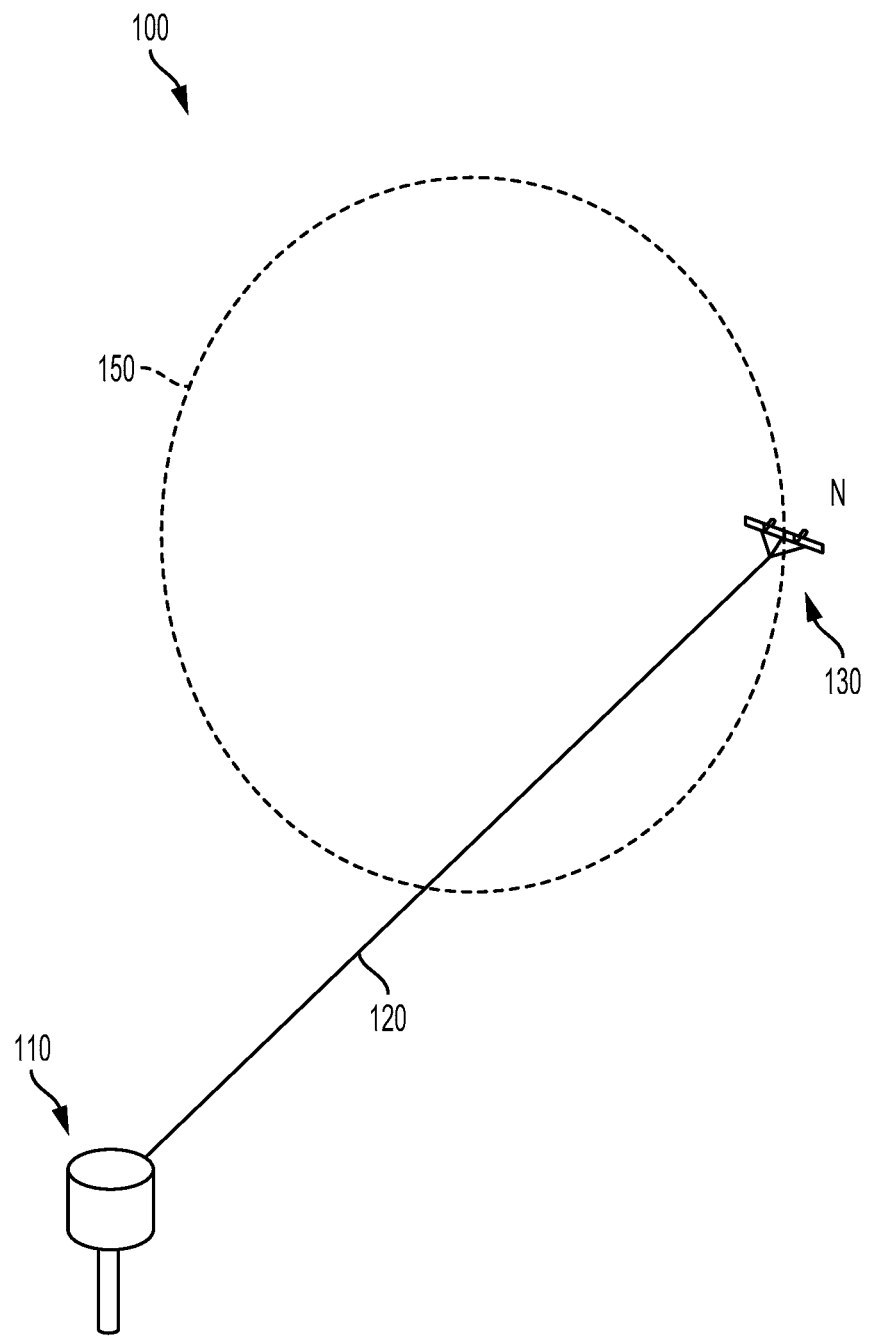
FIG. 1 depicts an Airborne Wind Turbine (AWT), according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

Overview

Operation of both traditional and airborne wind power systems has an associated risk of harm to birds, bats, or other flying animals and unmanned objects. Accordingly, embodiments described herein relate to Airborne Wind Turbines (AWTs) in which the path of the aerial vehicle (AV) can be responsively relocated to reduce, and hopefully minimize, the risk to airborne animals or unmanned objects resulting from operation of the AWT. In particular, illustrative embodiments may relate to or take the form of methods and systems for detecting airborne animals or unmanned objects, and responsively altering the flight path of the aerial vehicle in an effort to avoid the airborne animals or unmanned objects.

As an example, consider an AWT where the aerial vehicle is initially positioned downwind from the ground station and is flying crosswind on a first closed flight path. Further, the AWT may determine an operating area associated with the first closed flight path (e.g., the area or volume encompassed by the ellipsoidal path, and perhaps some buffer area or volume surrounding it). This arrangement increases (and hopefully maximizes) power generation, and thus may be implemented when no airborne objects are nearby. However, while operating in this manner, the AWT may determine that an airborne object (e.g., a flock of birds, colony of bats, or an unmanned object) is approaching with a trajectory that could take it through the operating area associated with the first closed flight path, thus creating a risk of contact between the object and the aerial vehicle. In response to such risk, the AWT may take action to reduce, and perhaps even eliminate, this risk.

As an example, the AWT may determine that the projected flight path of a flock of birds has a certain probability of overlapping with the operating area defined by the aerial vehicle's first closed flight path. Responsive to such a determination, the AWT may determine a second operating area for the aerial vehicle that will reduce, and hopefully minimize, the probability that the predicted flight path of the flock will take the flock through the second operating area. Further, the AWT may also take power generation into account when determining the second operating area. In particular, the AWT can try to find a second operating area at a location where offset crosswind flight is possible, and thus allows the aerial vehicle to continue generating power. The AWT may then transition the aerial vehicle to a second closed path that is within the second operating area (e.g., by rotating the flight-path center point about the ground station and/or adjusting the altitude of the flight-path center point).

Advantageously, an exemplary method may allow an AWT to continue generating power while taking precautionary action to avoid contact with birds or other unmanned airborne objects. As compared to traditional wind turbines, which typically shut down to avoid contact with airborne objects, an example AWT may simply rotate its flight path about the ground station, such that its operating area moves away from the flight path of an airborne object.

To illustrate possible benefits of an example AWT, consider an example configuration in which the aerial vehicle is connected to the ground station via a 450-meter tether. Further, while power generation may be optimized when the aerial vehicle's flight path is located directly downwind from the ground station, the AWT may be configured such that power generation is still possible when the AWT's flight path is offset by +/−25 degrees from a directly downwind position. A 450-meter tether with rotational range of +/−25 degrees allows the AWT to move horizontally by approximately +/−210 meters from a directly downwind position without discontinuing power generation. This freedom to move a significant distance while continuing power generation can help to reduce risk of contact with airborne objects.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, (ii) transmit electrical energy to the ground station via the tether (In some implementations, the ground station may transmit electricity to the aerial vehicle for take-off and/or landing.), and (iii) act as an airborne antenna transmitting electrical signals, such as broadcast and communication signals.

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at two or three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The tether may be further utilized to transmit communication signals to and from the aerial vehicle 130 and the ground station 110. The aerial vehicle 130 may be utilized as an airborne antenna receiving and transmitting electric signals such as broadcast or communication signals. The tether 120 may include one or more cables capable of transmitting such electronic signals and may include coaxial cables and Ethernet cables. In another embodiment, the tether 120 may act as an antenna. The tether 120 may be embedded with radio receivers and transmitters along the length of the tether 120 to receive and send electric signals.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high strength-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150. As shown in FIG. 1, the number of revolutions of the closed path 150 that the aerial vehicle 130 has traveled along may be represented by N.

B. Illustrative Components of an AWT

Figure 2:
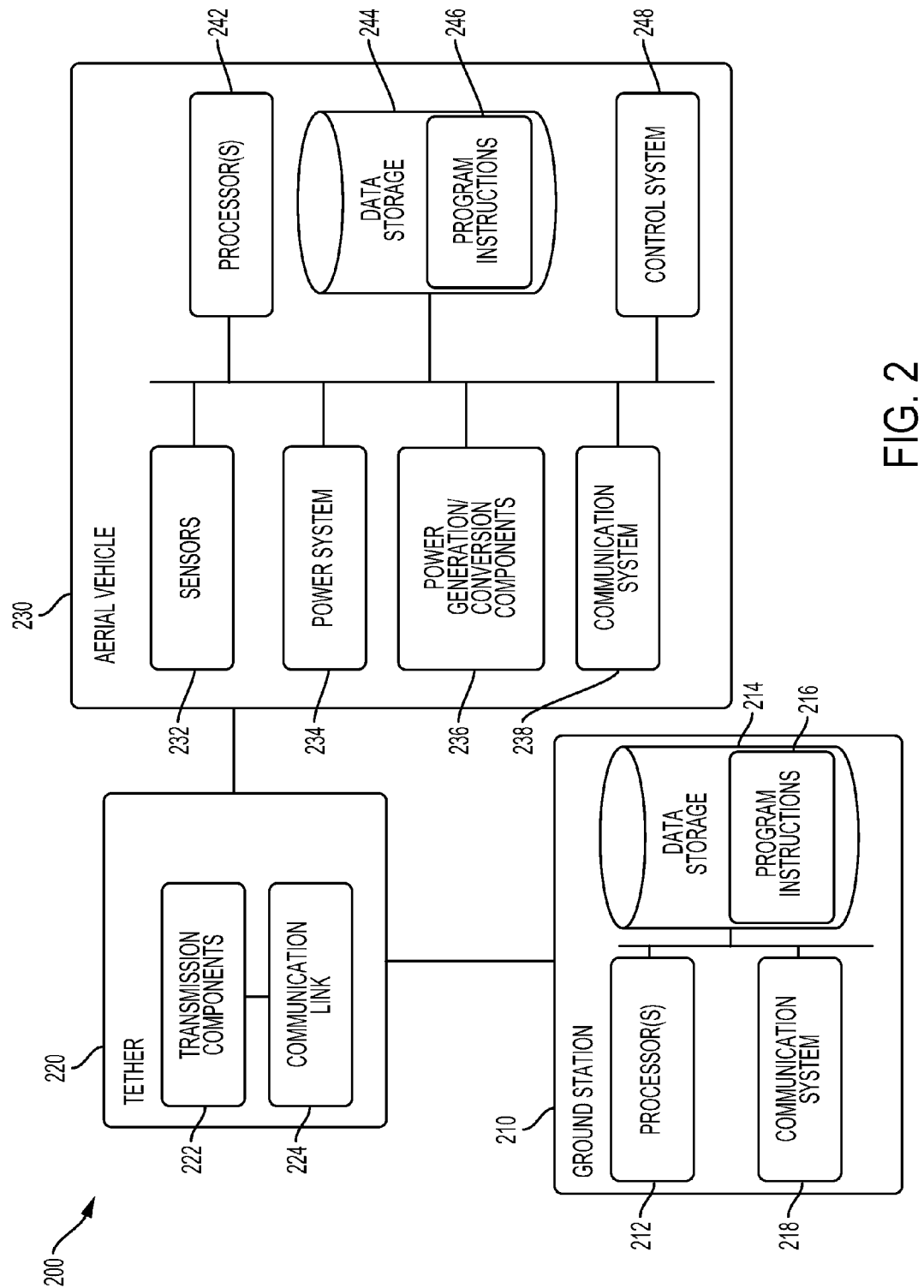
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224. The communication link 224 may further include antenna elements to receive and transmit electric signals such as communication or broadcast signals. The communication link 224 may further include Ethernet Over Power (EOP), where the physical link is a power cable used to transmit electrical power. Using EOP, the communication link does not entail a dedicated signal cable.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized Micro Electro Mechanical System (MEMS) or a Nano Electro Mechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible. In other embodiments, GPS signals may be used in conjunction with the IMU to estimate position, velocity, and/or acceleration estimation.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

In another example, the power system 234 that may include a plurality of batteries may be housed in the ground station 210. The power may be transmitted to the aerial vehicle 230 via a tether 220 to from the ground station 210. The aerial vehicle 230 may house a lower-power supply that may be rated to approximately 200-500 watts that may power the systems in the aerial vehicle 230. The aerial vehicle 230 may further house additional small batteries that may power the aerial vehicle 230 in case where the power system 234 in the ground station 210 goes off line or the tether 220 breaks and power to the aerial vehicle 230 is cut off.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at rated power from wind speeds of 11.5 meters per second and greater at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
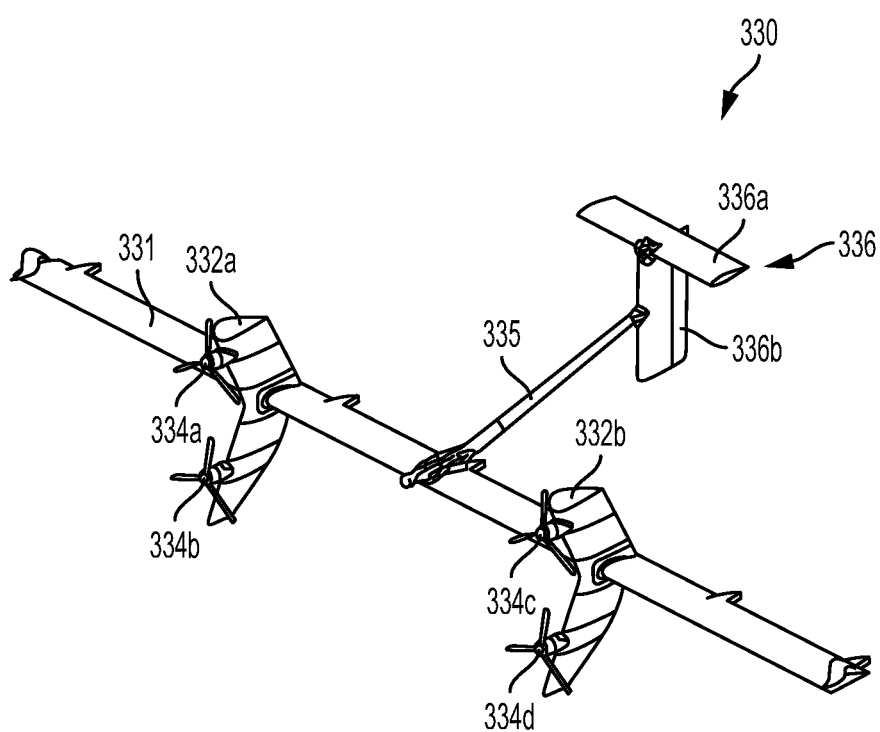
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 130 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

An antenna may be embedded inside or affixed to the tail wing 336a, vertical stabilizer 336b, tail boom 335, main wing 331 or any other part of the aerial vehicle 330. The antenna may be radio or broadcast antennas. Multiple antennas may be embedded to or affixed to the aerial vehicle 330.

While the aerial vehicle 330 has been described above, it should be understood that the systems and methods described herein could involve any suitable aerial vehicle that is connected to an airborne wind turbine tether, such as the tether 120 and/or the tether 220.

D. Illustrative Avoidance Maneuver

Figure 4A:
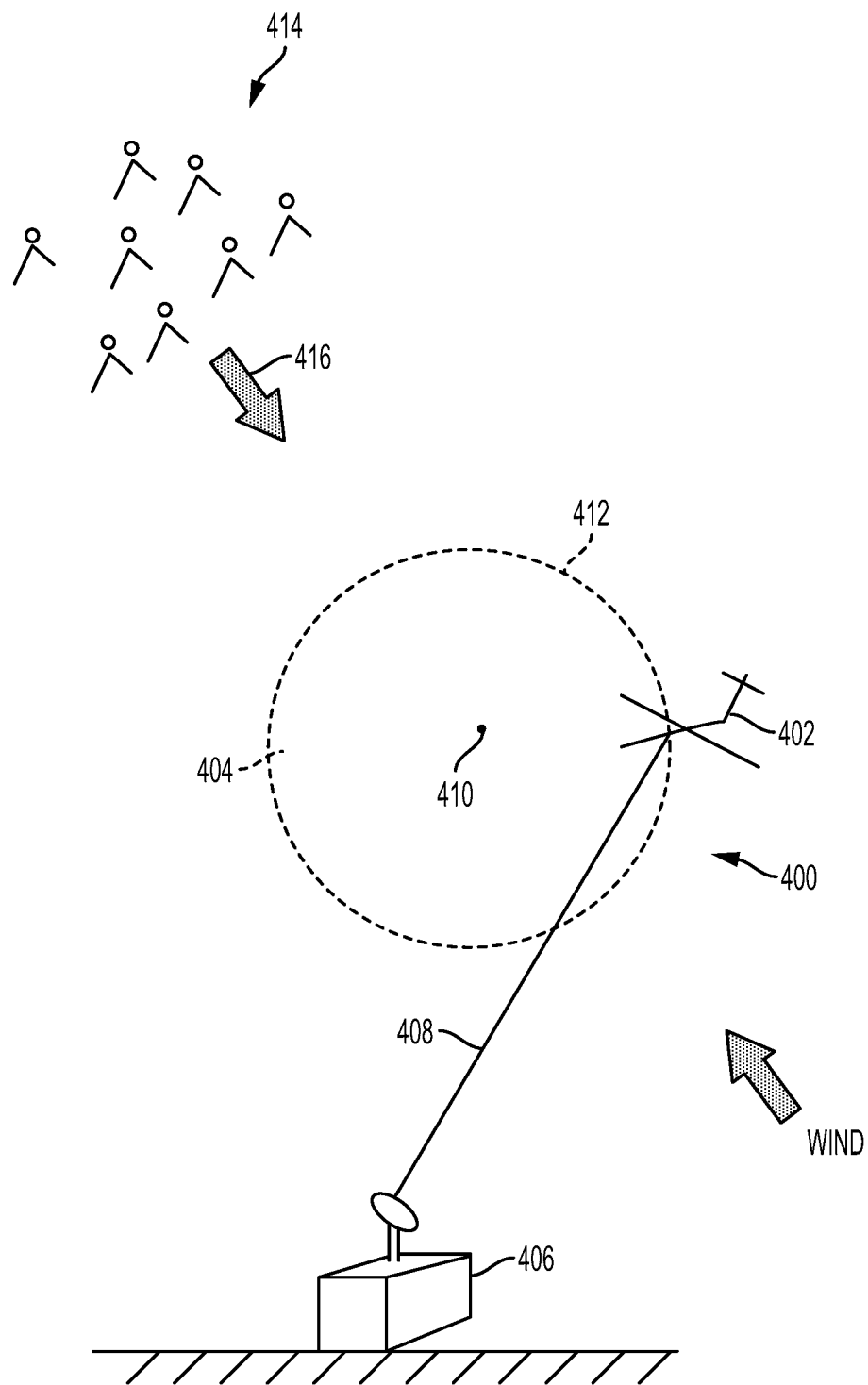
FIGS. 4A and 4B depicts an aerial vehicle coupled to a ground station via a tether, according to an example embodiment.

FIG. 4A depicts an AWT 400 where the aerial vehicle 402 is operating in a first operating area 404. The aerial vehicle 402 may be tethered to a ground station 406 via a tether 408. The tether 408 may have a length of 450 meters, but depending on the environment and power generation parameters, the length may be adjusted accordingly. A location of the first operating area 404 of the AWT may be defined by an area that may be enclosed by the first center point 410 of a first flight path 412 travelled by the aerial vehicle 402.

In some instances, airborne objects 414 may appear and head towards 416 the first operating area 404 of the aerial vehicle 402 from the downwind position of the location of the aerial vehicle 402. If the airborne objects 414 maintain their heading, the airborne objects 414 may come into contact with the aerial vehicle 402 travelling on the first flight path 412.

Airborne objects 414 may include both animals and inanimate objects. For example, airborne objects 414 may include birds, bats, commercial and consumer unmanned aerial vehicles (UAVs)/drones, insects, hail, or anything that may move through the air and may come into contact with the aerial vehicle 402. In another embodiment, airborne objects 414 may also refer to a group of objects or animals that may be travelling together. For example, all birds in a flock of migrating birds could be considered collectively as a single airborne object 414.

As the airborne objects 414 approach the aerial vehicle 402 travelling in the first flight path 412, the aerial vehicle 402 may detect the incoming airborne objects 414. The aerial vehicle 402 may detect the position of the incoming airborne objects 414 and in some embodiments may determine the projected incoming flight path 416 of the airborne objects 414. In another embodiment, the aerial vehicle 402 may further determine the location and time of a potential contact between the aerial vehicle 402 and the airborne objects 414. Specifics of the aerial vehicles 402 determination of the incoming airborne objects 414 will be discussed below.

Figure 4B:
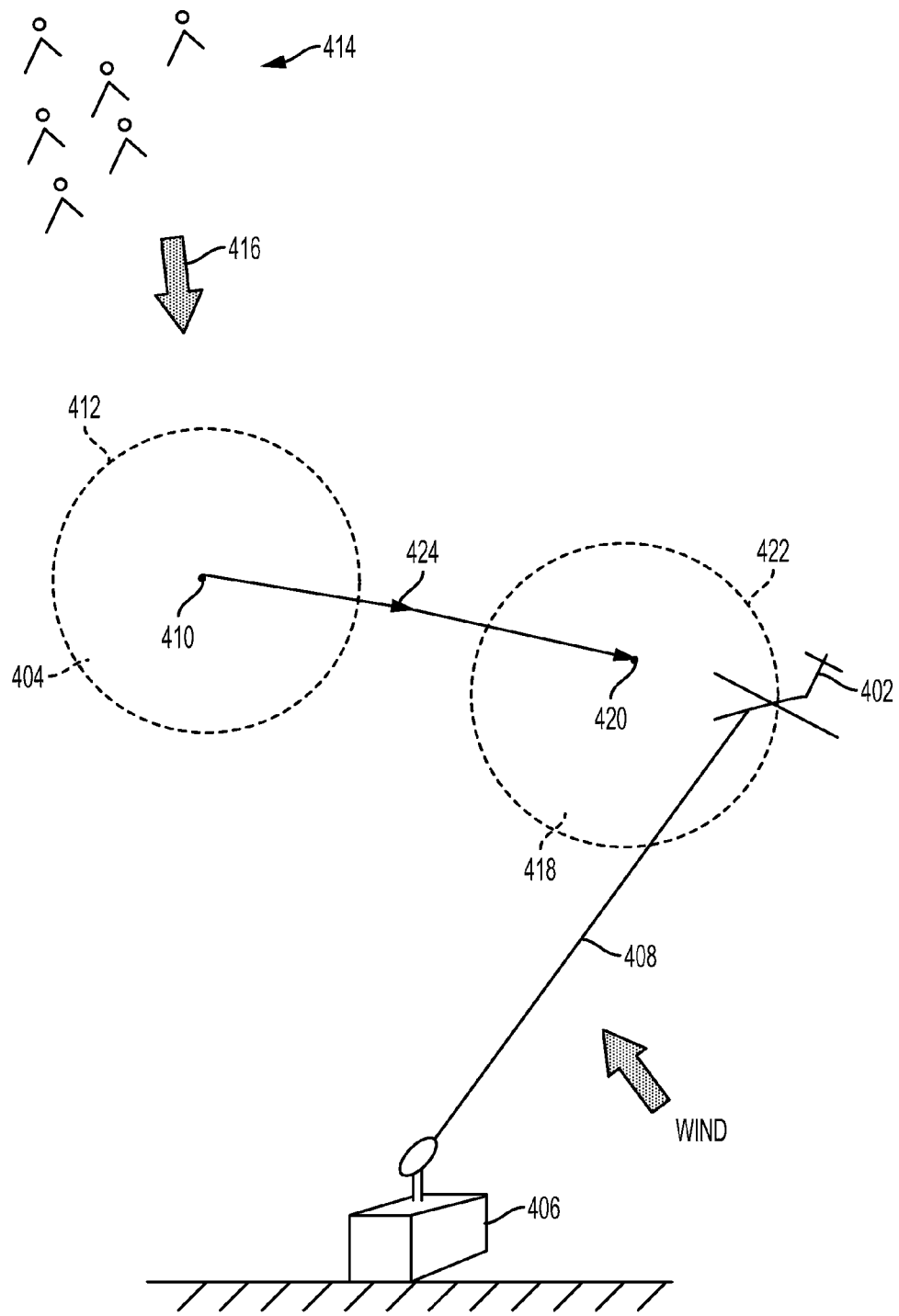

FIG. 4B depicts an aerial vehicle 402 having performed an avoidance maneuver after detecting incoming airborne objects 414. The aerial vehicle 402 re-positions itself such that the aerial vehicle 402 transitions into a second operating area 418 that is defined by a second center point 420 and a second flight path 422. The second center point 420 may be offset from the first center point 410 by up to +/−25 degrees at the ground station 406. The offset may be in the north-south direction, east-west direction and/or may be a combination of north-south and east-west directions, depending on the heading 416 of the incoming airborne objects 414. In an embodiment where the tether 408 may be 450 meters long, the sideways shift 424 translates into a distance of up to approximately +/−210 meters.

In another embodiment, the shift 424 may not affect the aerial vehicle's 402 ability to continue generating electricity. As the aerial vehicle 402 moves from the first operating area 404 to the second operating area 418, the aerial vehicle 402 may be able to maintain its position with respect to the wind such that the turbines on the aerial vehicle 402 continue to generate electricity. In another embodiment, the aerial vehicle 402 may halt the rotation of the turbines in cases where the incoming airborne objects 414 may potentially interfere with its operation. The stoppage may be brief, for example, just long enough to prevent any damage from the airborne objects 414 striking the turbines, or may be long enough such that it lasts until the aerial vehicle 402 performs another avoidance maneuver or the airborne objects 414 pass the aerial vehicle 402.

The first and second flight paths 412, 422 may share a similar path shape. In one embodiment, both first and second flight paths 412, 422 may be elliptical and share similar operational areas that are almost identical in size. In another embodiment, depending on the conditions following the shift 424 to the second flight path 422, the aerial vehicle 402 may enter into a second flight path 422 that may have a different shape compared to the first flight path 412. The second flight path 422 may take a more elliptical path or a more circular path, for example, compared to the first flight path 412.

In one embodiment, the first flight path 412 may be located substantially downwind of the ground station 406 such that travel of the aerial vehicle 402 on the first flight path 412 comprises crosswind flight, and wherein the rotation about the ground station 406 during the shift 424 is such that the second flight path 422 is angularly offset by the substantially downwind position of the first flight path 412.

In another embodiment, the first flight path may have a first alignment with respect to a first wind direction, and the first alignment may be selected in an effort to increase average power generation. The second flight path may have a second alignment with respect to a second wind direction. Here, the first and second wind direction may be the same prevailing wind direction but observed from that first and second flight path, respectively. The alignment may be measured in three dimensions, and may be defined by a combination of (a) an angle between the ground and the tether; and (b) the angle of rotation of the tether about the ground station. The first wind direction may be the direction of the wind with respect to the aerial vehicle travelling on the first flight path and the second wind direction may be the direction of the wind with respect to the aerial vehicle when travelling on the second flight path.

E. Determination of Airborne Objects Location Information

Location information for the airborne objects may be determined in a number of ways depending on the type of the airborne object using various sensor and communication systems that may be housed inside the ground station. Airborne objects may include both animals and inanimate objects. For example, airborne objects may include birds, bats, commercial and consumer unmanned aerial vehicles (UAVs)/drones, insects, hail, or anything that may move through the air and may come into contact with the aerial vehicle. For example, GPS coordinates (latitude, longitude) may be used to determine the location of the airborne object. This information may be provided by sensors or tags that are attached to the airborne objects that transmit its location signals to a satellite or other antenna receiver which in turn provides information to the AWT. In another embodiment, the AWT may receive GPS coordinates and altitude information of the airborne object.

In another embodiment, the aerial vehicle and/or the ground station of the AWT may include additional systems that detects and determines the relative position of the incoming airborne objects. The systems may include but not limited to LiDAR, radar, full spectrum camera, Infrared camera to provide position information of the airborne objects relative to the AWT. Although these systems may not be able to provide absolute position information of the airborne objects, absolute position may be computed if the position of the AWT is known.

In another embodiment, the position of the airborne objects may be determined using the aforementioned systems in addition to time. For example, the relative location of the airborne objects may be measured in time increments providing velocity and direction information in addition to location information. Velocity and direction information may provide past and present location in addition to aid in predicting future locations of the airborne objects at a certain point in time. Similarly, this information may also provide past, present and future flight path information of the airborne object. In one embodiment, wind speed information may be used to predict the trajectory of the airborne objects.

In another embodiment, the location information of the airborne object can be determined by information transmitted by the airborne object. Various systems and sensors may receive information from the airborne objects and transmit this information to the AWT. For example, in cases where the airborne object is a bird or a flock of birds, these birds may have been tagged such that their location and other information can be transmitted. It is well known that a number of migratory birds tagged in order for researchers to monitor the birds' location and migratory behavior. This information may provide real-time information of the birds' location and even the velocity and bearing of travel. This may allow the AWT to calculate and understand past and present information about the birds, but also potentially predict future location and flight path of the birds. This information may be used by the AWT to determine the location of the second flight path in order to avoid the incoming airborne objects.

In one embodiment, the airborne objects may lack a tagging device attached to them. In these cases, information about the airborne objects may be obtained by satellite or ground-based radar that tracks the motion of the airborne objects and transmits the location and movement information to the AWT.

In a further embodiment, the AWT may include systems and devices that can track the airborne objects and determine location and velocity information of the airborne objects. These systems and devices may be located in the ground station or the aerial vehicle. In some embodiments, the systems and devices may be located on the tether connecting the ground station and the aerial vehicle. The systems and devices may include LiDAR, radar, camera and other image processing and/or computer vision for bird/bat/aerial object detection, Infrared or spectral cameras, for example. These devices may transmit data to a computer located in the AWT that may further include processor, memory, and program instructions stored in the memory for airborne object detection.

In one embodiment, the systems and devices used to track the airborne objects may be located in a separate location away from the AWT. It may be located in the vicinity of the AWT or could be located in a centralized location where the systems and devices provide tracking information to a number of AWT's in a certain geographic location. Information gathered by the systems and devices may be transferred to the AWT's computer to be processed in order to track the airborne objects.

F. Avoidance Maneuver Determination

Figure 5:
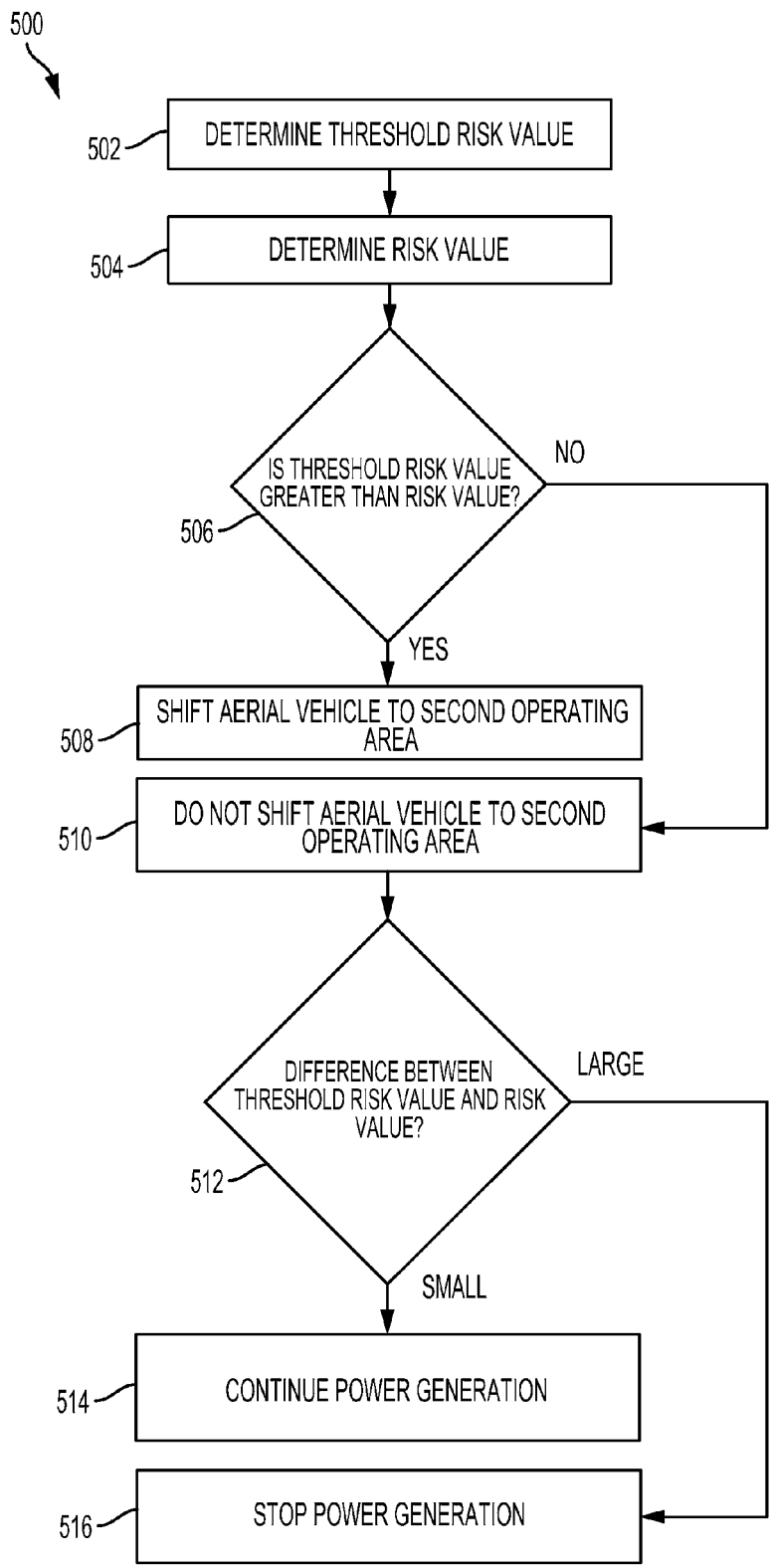
FIG. 5 depicts a flowchart illustrating AWT's determination of conducting an avoidance maneuver.

Referring to FIG. 5, the AWT may make a decision 500 to shift the aerial vehicle from the first operating area to the second operating area based on a number of factors. The AWT may decide to transfer in response to a calculation of a risk value that examines the risk of collision associated with the incoming airborne objects. Airborne objects may include both animals and inanimate objects. For example, airborne objects may include birds, bats, commercial and consumer unmanned aerial vehicles (UAVs)/drones, insects, hail, or anything that may move through the air and may come into contact with the aerial vehicle. The risk value may be compared to a threshold risk value to aid the AWT in determining whether to shift from the first operating area to the second operating area. In one embodiment, the threshold risk value will be set based on past encounters between an aerial vehicle of an AWT and airborne objects 502. The AWT may compute a risk value based on the information it receives from various sensors and devices. 504. The threshold risk value will evaluate factors such as but not limited to chances of the aerial vehicle colliding with the airborne objects, whether making a transfer to the second operating area may affect power generation, and whether power generation can continue unstopped when the airborne objects approach the aerial vehicle. If the risk value computed by the AWT is greater than the threshold risk value 506, the aerial vehicle may perform a maneuver transferring over to the second operating area 508. If the risk value is less than that of the threshold risk value, the aerial vehicle may maintain its movement in the first operating area 510. In some embodiments, if the difference between the threshold risk value and risk value is small 512, the aerial vehicle may continue to generate power 514. In another embodiment here the difference between the risk value and the threshold risk value is large 512, the aerial vehicle may, while not transferring to the second operating area, turn off the turbine to prevent damage from potential collision with the incoming airborne objects 516.

In cases where the risk value is greater than the threshold risk value, the AWT may transfer the aerial vehicle to the second operating area. As described above, the ground station of the AWT may rotate the heading of the tether by +/−25 degrees so that the center point of the second operating area may move approximately 210 meters in a number of directions relative to the center point of the first operating area. The AWT will determine a projected trajectory of the airborne objects based on the location information gathered from the sensors and devices. The AWT will then compare the determined projected trajectory to the first operating area to determine a risk value—whether the projected trajectory and the first operating area may contact with each other. If the determined risk value is greater than the threshold risk value, the AWT may determine that a transfer of the aerial vehicle to the second operating area may be warranted. The AWT may conduct another risk value determination to determine if there is a risk of contact between the projected trajectory of the airborne objects and the second operating area. The second operating area may be determined by identifying an area that may reduce the risk of contact between the aerial vehicle and the airborne objects compared to the risk of contact of the first operating area.

When the AWT determines that the trajectory of the airborne objects warrants a transition for the second operating area, the aerial vehicle may move horizontally, vertically, or in combination to the second operating area.

In cases where the determined risk value is less than the threshold risk value, the AWT may determine that it may allow the aerial vehicle to stay its course. In some embodiments, the AWT may turn off its power generating capabilities in order to prevent damage to the turbine from potential unexpected collision with the airborne objects. In another embodiment, the AWT may determine a region of the first operating area where the risk of collision between the aerial vehicle and the airborne objects is lowest and position the aerial vehicle in that safe zone as the airborne objects fly by the aerial vehicle. This positioning may allow the aerial vehicle to continue to generate electricity or modulate the level of electric generation depending on the risk of collision.

In another embodiment, determination of the second operating area may further entail determining a particular species of animal regarding the airborne object. By using the particular species of the animal as a further basis for determining the second operating area, the risk of contact between the aerial vehicle and the airborne object may be reduced compared to that of the first operating area. For example, by determining a particular species of the animal, characteristics associated with the particular species can be used, in addition to the general location and trajectory information of the airborne object, to more accurately predict the flight path of the species. Knowledge of the particular species may provide characteristic information such as: average, maximum, and/or minimum flight speed; average, maximum, and/or minimum flight altitude; other flight behaviors; typical flock size etc.

In some embodiments, in cases where location information is provided by satellite, such as via GPS or satellite tag embedded on the bird, the species of the bird may be used to determine whether the bird travels solo or in a flock. If in a flock, knowledge of the bird species may reveal an average size of a typical flock. The average size of a typical flock may further provide information regarding the formation and/or arrangement of the flock, including a typical size of the formation and/or arrangement. This information may provide additional information when determining the projected trajectory of the airborne objects and how it may change in the future. In another embodiment, information regarding the particular species of the bird may further provide information associated with seasonal behavior of the bird. For example, flock size, arrangement, or flight characteristic may vary depending on the seasons, and such information may be considered in determining the projected trajectory of the bird.

In another embodiment, a plurality of AWTs may be operating within a close distance from each other, such as in a farm set-up. Each AWT may analyze the trajectory of the incoming airborne objects and share that information with AWTs in the farm. Each AWT may use a variety of telecommunication antennas to share the information between each other. By sharing the trajectory information between AWTs, each AWT may be able to more accurately determine the exact trajectory of the airborne objects. The AWTs may also share position information of each of the aerial vehicles and their respective flight paths and operating areas. The aerial vehicle's position information may be used to prevent the flight paths of the aerial vehicles from overlapping and prevent any potential collisions between the aerial vehicles.

In one embodiment, in cases where the AWT determines that there may be an impending, unavoidable collision between the aerial vehicle and the airborne object, the aerial vehicle may be put in a hover flight mode. In hover flight mode, the aerial vehicle may hover in the air, like a helicopter, where its ground velocity will be zero in all directions. In an impending collision with the airborne object, because the aerial vehicle is not moving, the impact velocity between the two will be minimized. Hover mode may limit and minimize damage to the aerial vehicle and allow it to continue to operate normally even following a collision with the airborne object.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
    initially operating an aerial vehicle to travel on a first closed flight path, wherein the first closed flight path is within a first operating area, and wherein the aerial vehicle is connected to a ground station via a tether and generates power while traveling on the first closed flight path;
    determining location information corresponding to an airborne object;
    based on the location information corresponding to the airborne object, determining a risk value of the first operating area;
    comparing the risk value of the first operating area with a threshold risk value;
    when the risk value of the first operating area exceeds the threshold risk value by less than a predetermined amount, responsively operating the aerial vehicle within the first operating area; and
    when the risk value of the first operating area exceeds the threshold risk value by more than the predetermined amount, determining a second operating area for the aerial vehicle, wherein the second operating area has a risk value less than the risk value of the first operating area; and
    responsively operating the aerial vehicle to travel on a second closed flight path, wherein the aerial vehicle remains within the second operating area while traveling on the second closed flight path.

2. The method of claim 1, wherein operating the aerial vehicle on the second closed flight path comprises maintaining a position of the aerial vehicle relative to a wind direction such that the aerial vehicle continues generating power while traveling on the second closed flight path.

3. The method of claim 2, wherein average power generation while traveling on the second closed flight path is less than average power generation while traveling on the first closed flight path.

4. The method of claim 1, wherein the second closed flight path is angularly offset from the first closed flight path relative to the ground station.

5. The method of claim 1, wherein the first closed flight path is located substantially downwind of the ground station such that travel of the aerial vehicle on the first closed flight path comprises crosswind flight, and wherein a rotation about the ground station to the second closed flight path results in the second closed flight path being angularly offset from the substantially downwind position of the first closed flight path.

6. The method of claim 5, wherein the rotation about the ground station comprises a rotation in the range of +/−25 degrees between the location of the first closed flight path and the location of the second closed flight path.

7. The method of claim 1, wherein the airborne object comprises one or more birds or one or more bats.

8. The method of claim 1, wherein the airborne object comprises a commercial or a consumer unmanned aerial vehicle (UAV).

9. The method of claim 1, wherein the airborne object comprises an animal, the method further comprising:
    determining a particular species of the animal based on a tag configured to transmit information about the animal; and
    based on the particular species of the animal, determining the second operating area for the aerial.

10. The method of claim 1, further comprising:
    determining one or more flight characteristics of the airborne object; and
    based on the one or more flight characteristics, determining the second operating area for the aerial vehicle.

11. The method of claim 10, wherein the one or more flight characteristics comprise at least one of the following flight characteristics: (a) maximum, minimum, or average flight speed; (b) maximum, minimum, or average flight altitude; (c) seasonal variations of flight characteristic; (d) flock characteristics.

12. The method of claim 1, wherein the first closed flight path has a first alignment with respect to a wind direction, and the first alignment is selected in an effort to increase average power generation.

13. The method of claim 12, wherein the second closed flight path has a second alignment with respect to the wind direction.

14. The method of claim 13, wherein the second alignment is determined so as to maintain an average power generation amount while reducing a risk of contact between the aerial vehicle and the airborne object.

15. A system comprising:
    a sensor system operable to detect airborne objects;
    a communication system for communicating with an aerial vehicle, wherein the aerial vehicle is connected to a ground station via a tether;
    a computing system comprising a processor, wherein the computing system is configured to:
    initially operate the aerial vehicle to travel on a first closed flight path, wherein the first closed flight path is within a first operating area, and wherein the aerial vehicle generates power while traveling on the first closed flight path;

operate the sensor system to determine location information corresponding to an airborne object;

based on the location information corresponding to the airborne object, determine a first risk value that corresponds to the first operating area;

compare the first risk value to a threshold risk value;

when the first risk value exceeds the threshold risk value by less than a predetermined amount, operate the aerial vehicle within the first operating area;

when the first risk value exceeds the threshold risk value by more than the predetermined amount, determine a second operating area for the aerial vehicle, wherein the second operating area has a second risk value that is less than the first risk value that corresponds to the first operating area; and responsively operate of the aerial vehicle to travel on a second closed flight path, wherein the aerial vehicle remains within the second operating area while traveling on the second closed flight path.

16. The method of claim 1, wherein the second operating area is located within the first operating area.

17. The method of claim 1, wherein responsively operating the aerial vehicle within the first operating area comprises ceasing power generation.

18. The method of claim 1, further comprising:

after operating the aerial vehicle on the second closed flight path, determining that the risk value of the first operating area is below the threshold risk value; and based on the determination that the risk value of the first operating area is below the threshold risk value, returning the aerial vehicle to a closed flight path within the first operating area.

19. The method of claim 1, wherein an average power generation of the second operating area is a factor in the risk value of the second operating area.

20. The system of claim 15, wherein the determination of the second operating area for the aerial vehicle is further based on a wind direction, the computing system is further configured to:

reduce a difference between a first amount of power generated when the aerial vehicle is within the first closed flight path and a second amount of power generated when the aerial vehicle is within the second closed flight path, wherein the first closed flight path has a first alignment with respect to the wind direction, and further wherein the second closed flight path has a second alignment with respect to the wind direction.

* * * * *